(12) United States Patent
Manchuliantsau

(10) Patent No.: US 11,464,243 B1
(45) Date of Patent: Oct. 11, 2022

(54) SPENT BREWERS' YEAST BASED ALTERNATIVE MEAT

(71) Applicant: USARIUM INC., San Francisco, CA (US)

(72) Inventor: Aleh Manchuliantsau, San Francisco, CA (US)

(73) Assignee: USARIUM INC., San Francisco, CA (US)

( * ) Notice: Subject to any disclaimer, the term of this patent is extended or adjusted under 35 U.S.C. 154(b) by 0 days.

(21) Appl. No.: 17/571,995

(22) Filed: Jan. 10, 2022

Related U.S. Application Data

(63) Continuation of application No. 17/475,664, filed on Sep. 15, 2021.

(60) Provisional application No. 63/221,755, filed on Jul. 14, 2021.

(51) Int. Cl.
*A23J 1/18* (2006.01)
*A23L 31/10* (2016.01)
*A23J 3/22* (2006.01)
*A23J 3/26* (2006.01)

(52) U.S. Cl.
CPC .............. *A23J 1/18* (2013.01); *A23J 3/227* (2013.01); *A23J 3/26* (2013.01); *A23L 31/10* (2016.08)

(58) Field of Classification Search
CPC ...... A23J 1/18; A23J 3/227; A23J 3/26; A23L 31/10
USPC .......................................................... 426/49
See application file for complete search history.

(56) References Cited

U.S. PATENT DOCUMENTS

| | | |
|---|---|---|
| 2,162,729 A | 6/1939 | Levinson et al. |
| 2,235,613 A | 3/1941 | Grelck |
| 2,881,076 A | 4/1959 | Sair |
| 3,142,571 A | 7/1964 | McAnelly et al. |
| 3,527,642 A | 9/1970 | Harrison et al. |
| 3,586,662 A | 6/1971 | O'Connor |
| 3,723,131 A | 3/1973 | Bixby et al. |
| 3,754,926 A * | 8/1973 | Strommer ............... A23J 3/26 426/453 |
| 3,761,353 A | 9/1973 | Noe et al. |
| 3,787,583 A | 1/1974 | Hruby |
| 3,861,293 A | 1/1975 | Buffa et al. |
| 3,891,774 A | 6/1975 | Baker et al. |
| 3,904,769 A | 9/1975 | Sair et al. |
| 3,908,025 A | 9/1975 | Miller |
| 3,911,147 A | 10/1975 | Barham et al. |
| 3,950,564 A | 4/1976 | Puski et al. |
| 3,966,971 A | 6/1976 | Morehouse et al. |
| 3,971,306 A | 7/1976 | Wiese et al. |
| 4,024,286 A | 5/1977 | Cornelius et al. |
| 4,052,516 A | 10/1977 | Mitchell |
| 4,088,795 A | 5/1978 | Goodnight, Jr. et al. |
| 4,185,123 A | 1/1980 | Wenger et al. |
| 4,212,799 A | 7/1980 | Nuzzoto et al. |
| 4,310,558 A | 1/1982 | Nahm, Jr. |
| 4,315,034 A | 2/1982 | Levinson et al. |
| 4,423,082 A | 12/1983 | Bauernfeind et al. |
| 4,435,319 A | 3/1984 | Pearce |
| 4,454,804 A | 6/1984 | McCulloch |
| 4,505,936 A | 3/1985 | Meyers et al. |
| 4,515,818 A | 5/1985 | MacDonald et al. |
| 4,551,335 A | 11/1985 | Canella et al. |
| 4,794,011 A | 12/1988 | Schumacher |
| 4,901,635 A | 2/1990 | Williams |
| 4,937,085 A | 6/1990 | Cherry et al. |
| 4,973,490 A | 11/1990 | Holmes |
| 5,097,017 A | 3/1992 | Konwinski |
| 5,270,062 A | 12/1993 | Buchs |
| 5,296,253 A | 3/1994 | Lusas et al. |
| 5,328,562 A | 7/1994 | Rafferty et al. |
| 5,346,714 A | 9/1994 | Peters |
| 5,391,384 A | 2/1995 | Mazza |
| 5,436,023 A | 7/1995 | Avera |
| 5,685,218 A | 11/1997 | Kemper |
| 5,702,746 A | 12/1997 | Wiik |
| 5,725,902 A | 3/1998 | Lesueur-Brymer et al. |
| 5,888,307 A | 3/1999 | Solheim |
| 5,912,034 A | 6/1999 | Martin et al. |
| 5,976,387 A | 11/1999 | Higo et al. |
| 5,976,594 A | 11/1999 | LaFollette |
| 6,039,999 A | 3/2000 | Bakshi et al. |
| 6,045,851 A | 4/2000 | Cross |
| 6,132,791 A | 10/2000 | Fox |
| 6,165,349 A | 12/2000 | Madar |
| 6,197,081 B1 | 3/2001 | Schmidt |
| 6,534,105 B2 | 3/2003 | Kartchner |
| 6,635,301 B1 | 10/2003 | Howsam |

(Continued)

FOREIGN PATENT DOCUMENTS

| | | |
|---|---|---|
| BY | 10488 C1 | 4/2008 |
| CA | 968214 A | 5/1975 |

(Continued)

OTHER PUBLICATIONS

Gibson et al. Can Inst. Food Technol. J. 3: 113-115 (Year: 1970).*
Gibson, D.; Dwivedi, B. Production of Meat Substitutes from Spent Brewers' Yeast and Soy Protein, Can. Inst. Food Technol. J. 1970, 3, 113-115.
Dietary Guidelines for Americans, Ninth edition, 2020, available at https://www.dietaryguidelines.gov.

(Continued)

*Primary Examiner* — Hamid R Badr

(74) *Attorney, Agent, or Firm* — K&L Gates LLP

(57) ABSTRACT

Alternative meat from a material comprising spent brewers' yeast as the primary ingredient is provided herein. The product contains from 20% to 80% dry weight spent brewers' yeast, has a meaty flavor and texture, and a reduced RNA content, making it safe for human consumption.

20 Claims, 4 Drawing Sheets

(56) References Cited

U.S. PATENT DOCUMENTS

| | | | |
|---|---|---|---|
| 6,800,308 B2 | 10/2004 | Maenz et al. |
| 6,905,600 B2 | 6/2005 | Lee, Jr. |
| 6,955,831 B2 | 10/2005 | Higgs et al. |
| 7,575,771 B2 | 8/2009 | Ciantar et al. |
| 7,771,699 B2 | 8/2010 | Adams et al. |
| 7,932,065 B2 | 4/2011 | Medoff |
| 7,968,760 B2 | 6/2011 | Lee, Jr. |
| 7,989,011 B2 | 8/2011 | Newkirk et al. |
| 7,989,592 B2 | 8/2011 | Ganjyai et al. |
| 8,017,171 B2 | 9/2011 | Sample |
| 8,017,820 B2 | 9/2011 | Foody et al. |
| 8,048,652 B2 | 11/2011 | Fichtali et al. |
| 8,057,639 B2 | 11/2011 | Pschorn et al. |
| 8,133,393 B2 | 3/2012 | Stuart |
| 8,192,769 B2 | 6/2012 | Wester et al. |
| 8,278,081 B2 | 10/2012 | Schmidt |
| 8,293,297 B2 | 10/2012 | Orcutt et al. |
| 8,365,433 B2 | 2/2013 | Orura |
| 8,372,464 B2 | 2/2013 | Dierking |
| 8,415,122 B2 | 4/2013 | Medoff et al. |
| 8,481,677 B2 | 7/2013 | Barrows et al. |
| 8,506,716 B2 | 8/2013 | Ahring et al. |
| 8,529,976 B2 | 9/2013 | McMindes et al. |
| 8,603,558 B1 | 12/2013 | Almutairi |
| 8,642,109 B2 | 2/2014 | Baumer et al. |
| 8,685,485 B2 | 4/2014 | McMindes et al. |
| 8,728,542 B2 | 5/2014 | Pickardt et al. |
| 8,735,544 B1 | 5/2014 | Prevost et al. |
| 8,820,328 B2 | 9/2014 | Ehling et al. |
| 8,945,352 B2 | 2/2015 | Medoff |
| 8,951,778 B2 | 2/2015 | Medoff et al. |
| 8,986,774 B2 | 3/2015 | Ganjval |
| 9,084,948 B2 | 7/2015 | Mazza et al. |
| 9,109,180 B2 | 8/2015 | Wolf et al. |
| 9,125,962 B2 | 9/2015 | Michalek et al. |
| 9,179,692 B2 | 11/2015 | Trass et al. |
| 9,206,453 B2 | 12/2015 | Medoff et al. |
| 9,259,017 B2 | 2/2016 | Dhalleine et al. |
| 9,370,200 B2 | 6/2016 | Gibbons et al. |
| 9,856,601 B2 | 1/2018 | Stromberg |
| 9,878,355 B2 | 1/2018 | Norris et al. |
| 9,907,322 B2 | 3/2018 | McMindes et al. |
| 10,039,306 B2 | 8/2018 | Vrljic et al. |
| 10,051,878 B2 | 8/2018 | Helling et al. |
| 10,172,380 B2 | 1/2019 | Varadan et al. |
| 10,214,751 B2 | 2/2019 | Nilsen et al. |
| 10,264,805 B2 | 4/2019 | Spinelli et al. |
| 10,299,500 B2 | 5/2019 | Passe et al. |
| 10,344,342 B2 | 7/2019 | Kusuda et al. |
| 10,550,352 B2 | 2/2020 | Hewitt et al. |
| 10,645,950 B2 | 5/2020 | Manchuliantsau et al. |
| 2002/0155206 A1 | 10/2002 | Orlando |
| 2002/0174780 A1 | 11/2002 | Clifford |
| 2003/0064145 A1 | 4/2003 | Fannon |
| 2004/0067289 A1 | 4/2004 | Tricoit et al. |
| 2004/0081742 A1 | 4/2004 | Levi et al. |
| 2004/0185148 A1 | 9/2004 | Said |
| 2004/0202771 A1 | 10/2004 | Lee |
| 2004/0224065 A1 | 11/2004 | Markham et al. |
| 2004/0237859 A1 | 12/2004 | Hartmann |
| 2005/0095346 A1 | 5/2005 | Borders et al. |
| 2005/0136162 A1 | 6/2005 | Kvist et al. |
| 2005/0249860 A1 | 11/2005 | Konecsni et al. |
| 2006/0040022 A1 | 2/2006 | Bouraoui |
| 2006/0093718 A1 | 5/2006 | Jurkovich et al. |
| 2006/0216397 A1 | 9/2006 | Kerkman |
| 2007/0014896 A1 | 1/2007 | Wong et al. |
| 2007/0087107 A1 | 4/2007 | Borders et al. |
| 2007/0092616 A1 | 4/2007 | Witte et al. |
| 2007/0172540 A1 | 7/2007 | Neece et al. |
| 2007/0269580 A1 | 11/2007 | Werstak |
| 2008/0008815 A1 | 1/2008 | Cho |
| 2008/0008816 A1 | 1/2008 | Singh et al. |
| 2008/0008817 A1 | 1/2008 | Singh et al. |
| 2008/0008820 A1 | 1/2008 | Singh et al. |
| 2008/0138495 A1 | 6/2008 | Barraclough et al. |
| 2008/0160132 A1 | 7/2008 | Silver et al. |
| 2008/0233266 A1 | 9/2008 | Boerboom |
| 2009/0053800 A1 | 2/2009 | Friend et al. |
| 2009/0155444 A1 | 6/2009 | Yakubu et al. |
| 2009/0155447 A1 | 6/2009 | Moore et al. |
| 2009/0155448 A1 | 6/2009 | Solorio et al. |
| 2010/0021609 A1 | 1/2010 | Mattson et al. |
| 2010/0112136 A1 | 5/2010 | Ward et al. |
| 2010/0166940 A1 | 7/2010 | McMindes et al. |
| 2011/0027433 A1 | 2/2011 | Ruf et al. |
| 2011/0081689 A1 | 4/2011 | Flanegan et al. |
| 2011/0172142 A1 | 7/2011 | Smith et al. |
| 2011/0212239 A1 | 9/2011 | Carin et al. |
| 2011/0309559 A1 | 12/2011 | Franke et al. |
| 2011/0311599 A1 | 12/2011 | Boursier et al. |
| 2012/0093994 A1 | 4/2012 | Hsieh et al. |
| 2012/0171351 A1 | 7/2012 | Solorio |
| 2012/0294986 A1 | 11/2012 | Choromanskl et al. |
| 2012/0301598 A1 | 11/2012 | Karges et al. |
| 2013/0052682 A1 | 2/2013 | Medoff et al. |
| 2013/0109065 A1 | 5/2013 | Godfroid et al. |
| 2013/0243904 A1 | 9/2013 | Cordle et al. |
| 2013/0287909 A1 | 10/2013 | Lewis et al. |
| 2014/0088330 A1 | 3/2014 | Powell et al. |
| 2014/0096764 A1 | 4/2014 | Komplin et al. |
| 2014/0134316 A1 | 5/2014 | Jincks et al. |
| 2014/0141127 A1 | 5/2014 | Jincks et al. |
| 2014/0273140 A1 | 9/2014 | Langhauser |
| 2014/0328984 A1 | 11/2014 | Legault |
| 2015/0017312 A1 | 1/2015 | Tegel |
| 2015/0041574 A1 | 2/2015 | Anderson |
| 2015/0056324 A1 | 2/2015 | Cecava et al. |
| 2015/0181907 A1 | 7/2015 | Baumer et al. |
| 2015/0223498 A1 | 8/2015 | Gu et al. |
| 2015/0250212 A1 | 9/2015 | Diaz et al. |
| 2015/0367298 A1 | 12/2015 | Wenger |
| 2016/0017444 A1 | 1/2016 | Medoff et al. |
| 2016/0108187 A1 | 4/2016 | Wendeln et al. |
| 2016/0143337 A1 | 5/2016 | Passe |
| 2016/0295897 A1 | 10/2016 | Lis et al. |
| 2016/0309743 A1 | 10/2016 | Spinelli et al. |
| 2016/0360770 A1 | 12/2016 | Sherlock et al. |
| 2017/0105438 A1 | 4/2017 | Ajami et al. |
| 2017/0226439 A1 | 8/2017 | Nguyen et al. |
| 2017/0226535 A1 | 8/2017 | Tudman |
| 2017/0226695 A1 | 8/2017 | Rowlands et al. |
| 2017/0280756 A1 | 10/2017 | Jaramillo Freydell et al. |
| 2017/0303558 A1 | 10/2017 | Eisner et al. |
| 2018/0310590 A1 | 11/2018 | Manchuliantsau |
| 2018/0327792 A1 | 11/2018 | Brown et al. |
| 2019/0000120 A1 | 1/2019 | Hossen et al. |
| 2019/0075820 A1 | 3/2019 | Redl et al. |
| 2019/0153122 A1 | 5/2019 | Mateus et al. |
| 2019/0183155 A1 | 6/2019 | Manchuliantsau |
| 2019/0223475 A1 | 7/2019 | Manchuliantsau et al. |
| 2019/0223476 A1 | 7/2019 | Manchuliantsau et al. |
| 2020/0060308 A1 | 2/2020 | Manchuliantsau et al. |
| 2020/0138055 A1 | 5/2020 | Schein |
| 2020/0260758 A1 | 8/2020 | Manchuliantsau et al. |

FOREIGN PATENT DOCUMENTS

| | | |
|---|---|---|
| CA | 1177323 A | 11/1984 |
| CA | 2652384 C | 11/2014 |
| CA | 3014516 A1 | 9/2017 |
| CN | 102742661 A | 10/2012 |
| EP | 0092443 A1 | 10/1983 |
| EP | 0455889 B1 | 3/1995 |
| EP | 2218497 A1 | 8/2010 |
| EP | 3491931 A1 | 6/2019 |
| GB | 116357 A | 6/1918 |
| KR | 19930019123 A | 10/1993 |
| KR | 100248275 B1 | 3/2000 |
| KR | 100767809 B1 | 10/2007 |
| RU | 2297155 C2 | 4/2007 |
| RU | 2631827 C1 | 9/2017 |
| WO | WO 2009/129320 A2 | 10/2009 |
| WO | WO 2009/134791 A | 11/2009 |

(56) References Cited

FOREIGN PATENT DOCUMENTS

| WO | WO 2010/135679 A1 | 11/2010 |
|---|---|---|
| WO | WO 2011/107760 A2 | 9/2011 |
| WO | WO 2017/075078 A1 | 5/2017 |
| WO | WO 2019/102248 A1 | 5/2019 |
| WO | WO 2019/106072 A1 | 6/2019 |

OTHER PUBLICATIONS

USDA Food Availability (Per Capita) Data System, 2021, available at https://www.ersusda.gov/data-products/food-availability-per-capita-data-system/.

J.C. Edozien et al., Effects of high levels of yeast feeding on uric acid metabolism of young men, Nature vol. 228, Oct. 10, 1970, p. 180.

Marson, G.V.; Saturno, R.P.; Comunian, T.A.; Consoli, L.; Machado, M.T.D.C.; Hubinger, M.D., Maillard conjugates from spent brewer's yeast by-product as an innovative encapsulating material, Food Res. Int. 2020, 136, 109365. ISSN 0963-9969, https://doi.org/10.1016/j.foodres.2020.109365.

Canepa, A.; Pieber, M.; Romero, C.; Tohá, J.C. A method for large reduction of the nucleic acid content of yeast, Biotechnol. Bioeng. 1972, vol. 14, 173-177.

Trevelyan, W.E., Chemical methods for the reduction of the purine content of baker's yeast, a form of single-cell protein, J. Sci. Food Agric. 1976, vol. 27, 225-230.

Jaeger A, Arendt EK, Zannini E, Sahin AW. Brewer's Spent Yeast (BSY), an Underutilized Brewing By-Product. Fermentation. 2020; 6(4):123. https://doi.org/10.3390/fermentation6040123.

ADM, PRO-FAM® 974, Isolated Soy Protein, 066-974, Jun. 26, 2008, 1 page.

Da Graca Costa do Nascimento et al., "Use of sesame oil cake (*Sesamum indicum L.*) on corn expanded extrudates", Food Research International, 2012, vol. 45, pp. 434-443.

Sivaramakrishnan et al., "Chapter 13 Edible Oil Cakes", Biotechnology for Agro-Industrial Residtses Utilisation, 2009, pp. 253-271.

Suknark et al., "Physical Properties of Directly Expanded Extrudates Formulated from Partially Defatted Peanut Flour and Different Types of Starch", Food Research International, 1997, vol. 30, No. 8, pp. 575-583.

Sokolowska et al., "Characteristics of rapeseed oilcake using nitrogen adsorption", International Agrophysics, 2013, 27, pp. 329-334.

Stein, "Nutritional Value of High Fiber Coproducts from the Copra, Palm Kernel, and Rice Industries in Diets Fed to Pigs", Journal of Animal Science and Biotechnology, 2015, vol. 6, No. 56, 9 pages.

Suttirak et al., "Potential Application of Ascorbic Acid, Citric Acid and Oxalic Acid for Browning Inhibition in Fresh-Cut Fruits and Vegetables", Walailak J Sci & Tech, 2010, vol. 7, No. 1, pp. 5-14.

McEvily et al., "Inhibition of Enzymatic Browning in Foods and Beverages", Critical Reviews in Food Science and Nutrition, 1992, vol. 32, No. 3, 253-273.

Narita et al., "Degradation Kinetics of Chlorogenic Acid at Various pH Values and Effects of Ascorbic Acid and Epigallocatechin Gallate on Its Stability under Alkaline Conditions", J. Agric. Food Chem., 2013, vol. 61, pp. 966-972.

Salgado et al., "Sunflower Protein Concentrates and Isolates Prepared from Oil Cakes Have High Water Solubility and Antioxidant Capacity", J Am Oil Chem Soc, 2011, 88, pp. 351-360.

Wong, Jacqueline, "Food Waste Diversion Options Analysis in Pomona, CA", A Thesis presented to the faculty of California State Polytechnic University, Pomona, 2018, 99 pages.

Bhatt et al., "From food waste to value-added surplus products (VASP): Consumer acceptance of a novel food product category", J Consumer Behav., 2017, pp. 1-7.

Pakhomova O.N., "Development and use of a functional food fortifier from rapeseed cake", Thesis for application for academic degree of Ph.D., Orel, 2014. (English abstract included at p. 1—corresponds to Pakhomova O.N., "Development and use of functional rapeseed meal enrichment agent" as cited in the Dec. 5, 2019 International Search Report and Written Opinion of the ISA for international Application No. PCT/US2019/044258).

International Search Report and Written Opinion of the International Searching Authority for International Application No. PCT/US2018/030084 dated Aug. 9, 2018.

Shepon et al., "Energy and protein feed-to-food conversion efficiencies in the US and potential food security gains from dietary changes", Environ. Res. Lett. 11, Oct. 2016, 8 pages.

Rodrigues et al., "Increasing the Protein Content of Rapeseed Meal by Enzymatic Hydrolysis of Carbohydrates", BioResources, 9(2), 2014, pp. 2010-2025.

Brugger et al., "Next Generation Texturized Vegetable Proteins", Food Marketing & Technology, Apr. 2017, pp. 20-24.

Brookfield CT3, Tenure Analyzer, Operating instructions, Manual No. M08-372-C0113, Brookfield Engineering Laboratories, Inc., 56 pages.

Vestjens, Laura, MSc Thesis Biobased Chemistry and Technology, Sunflower-based protein fractions for food applications, Wageningen University & Research, Jul. 7, 2017.

Berk, Zeki, Chapter 6: Isolated Soybean Protein, Technology of Production of Edible Flours and Protein Products from Soybeans, FAO Agricultural Services Bulletin No. 97, http://www.fao.org/3/t0532e/t0532e07.htm, accessed Oct. 31, 2019.

Deshpande et al., "Optimization of a chocolate-favored, peanut-soy beverage using response surface methodology (RSM) as applied to consumer acceptability data", Swiss Society of Food Science and Technology, 41, 2008, pp. 1485-1492.

Ren et al., "Isolation and Characterization of Sunflower Protein Isolates and Sunflower Globulins", Information Tech. and Agricultural Eng., AISC 134, 2012, pp. 441-449.

Perednya et al., "The Fodder Production's Extrusion Technologies", Vestnik NIIMZh Journal No. 4 (20), 2015, pp. 60-63. (English abstract included at p. 63—corresponds to Perednya V.I. et al. "Extrusion technology in feed production" as cited in the Dec. 5, 2019 International Search Report and Written Opinion of the ISA for International Application No. PCT/US2019/044258).

International Search Report and Written Opinion of the International Searching Authority for International Application No. PCT/US2019/044258 dated Dec. 5, 2019.

Markov, S.A. et al., "Features of Fractions Chemical Compound of Sunflower Oilcakes and Meal at them Reagentless Division",Izvestiia VUZov. Pishchevaia Tekhnologiia, No. 1, 2012, pp. 29-31. (English abstract included at p. 31—corresponds to Markov S.A. et al., "Features of the chemical composition of fractions of sunflower meal and meal during their reagent-free separation" as cited in the Dec. 5, 2019 International Search Report and Written Opinion of the ISA for International Application No. PCT/US2019/044258).

Andrianova E.N., "Chlorogenic Acid and Productivity of Broilers," All-Russian Research and Technological Poultry Institute (VNITIP), No. 9, 2015, pp. 17-21. (English abstract included at p. 17—corresponds to Andrianova cited in the Dec. 5, 2019 International Search Report and Written Opinion of the ISA for International Application No. PCT/US2019/044258).

Meal/WholeSeed Feeding, National Sunflower Association, accessed Feb. 20, 2020 from https://www.sunflowernsa.com/wholeseed/, 1 page.

Sunflower as a Feed, National Sunflower Association, accessed Feb. 20, 2020 from https://www.sunflowernsa.com/wholeseed/sunflower-as-a-feed/, 6 pages.

Sunflower Protein, AURI, Agricultural Utilization Research Institute, 2018, 2 pages.

Wildermuth, et al., "Chlorogenic Acid Oxidation and Its Reaction with Sunflower Proteins to Form Green-Colored Complexes", Comprehensive Reviews in Food Science and Food Safety, 2016, vol. 15, pp. 829-843.

ABC about PLANETARIANS, video aired Mar. 19, 2018, KSTP-TV, Minneapolis, MN, accessed from https://www.youtube.com/watch?v=5df9_0Wvnjl&feature=youtu.be.

"Planetarians Aiming to Fight Childhood Obesity with Food Waste", Sustainable Brands, Nov. 16. 2017, accessed from https://sustainablebrands.com/read/waste-not/planetarians-aiming-to-fight-childhood-obesity-with-food-waste, 5 pages.

(56) References Cited

OTHER PUBLICATIONS

Stone, Dawna, "Do Planetarians Sunflower Chips Have More Protein Than Beef?!", Bold Business, Feb. 27, 2018, accessed from https://www.boidbusiness.com/nutrition/planetarians-sunflower-chips-more-protein-beef/, 6 pages.
Feeding the Future, Successful Farming, Sep. 17, 2019, accessed from https://www.agriculture.com/news/business/feeding-the-future, 9 pages.
Today's Dietician, Great Valley Publishing Company, Inc., May 2018, vol. 20, No. 5, 69 pages.
Planetarians: "Animal Agriculture Cannof Feed the World", Oct. 26, 2018, vegconomist, accessed from https://vegconomist.com/interviews/planetarians-animal-agriculture-cannot-feed-the-world/, 8 pages.
Burwood-Taylor, Louisa, 2019 AgFunder AgriFood Tech Innovation Awards Winners Announced, AgFunder Network Partners, Mar. 21, 2019, accessed from https://agfundernews.com/2019-agfunder-innovation-awards-winners-announced.html, 4 pages.
PLANETARIANS Sunflower Chips, National Sunflower Association, Dec. 1, 2018, accessed from https://www.sunflowernsa.com/magazine/articles/default.aspx?, 4 pages.
Askew, Katy, "Planetarians ties-up with Barilla, Amadori to innovate with up-cycled sunflower flour", Mar. 19, 2019, FoodNavigator.com, accessed from https://www.foodnavigator.com/Article/2019/03/19/Planetarians-ties-up-with-Barilla-Amadori-to-innovate-with-up-cycled-sunflower-flour?utm_source=copyright&utm_medium=OnSite&utm_campaign=copyright, 5 pages.
Murray, Sarah, "Accelerators speed development of promising food start-ups", Financial Times, Mar. 11, 2019, accessed from https://www.ft.com/content/778c9f5e-294e-11e9-9222-7024072222bc, 4 pages.
Peters, Adele, "Everything you need to know about the booming business of fighting food waste", Jun. 19, 2019, accessed from https://www.fastcompany.com/90337075/inside-the-booming-business-of-fighting-food-waste, 7 pages.
Leinonen et al., "Lysine Supply Is a Critical Factor in Achieving Sustainable Globai Protein Economy", Frontiers in Sustainable Food Systems, Apr. 2019, vol. 3, Article 27, 11 pages.
Ajandouz, et al., "Nonenzymatic Browning Reaction of Essential Amino Acids: Effect of pH on Caramelization and Maillard Reaction Kinetics", J. Agric. Food Chem. 1999, 47, 5, 1786-1793. English abstract only.
Lin et al., Extrusion Process Parameters, Sensory Characteristics, and Structural Properties of a High Moisture Soy Protein Meat Analog, Journal of Food Science, vol. 60, No. 3, 2002, pp. 1066-1072.
Solae™ Product Standard, Supra® 320, Isolated Soy Protein, Version: 1.0 Issue Date Apr. 2, 2010, 4 pages.
Uriman Grain Product Specification Sheet for Non-GMO U.S. Soybean Meal, Select 5CF, Dec. 7, 2010, 1 page.
International Feed, Sunflower Seed Meal Product Sheet, Feb. 17, 2015, 1 page.
Sotillo et al., Corn Meal-Sunflower Meal Extrudates and Their Physicochemical Properties, Journal of Food Science, vol. 59, No. 2, 1994, pp. 432-435.
Yue et al., Native and Succinylated Sunflower Proteins Use in Bread Baking, Journal of Food Science, vol. 56, No. 4, 1991, pp. 992-995.
Reddy et al., Supplementation of Wheat Muffins with Dried Distillers Grain Flour, Journal of Food Quality, 9, 1986, pp. 243-249.
Arepa with Soy, Mintel, Record ID 6281913, Jan. 25, 2019, http://www.gnpd.com, 2 pages.
International Search Report and Written Opinion of the International Searching Authority for International Application No. PCT/US2020/052385 dated Dec. 7, 2020.

* cited by examiner

SPENT BREWERS' YEAST BASED ALTERNATIVE MEAT

CROSS-REFERENCE TO RELATED APPLICATIONS

This present application is a continuation of U.S. patent application Ser. No. 17/475,664, filed on Sep. 15, 2021, which application claims the benefit of U.S. provisional patent application Ser. No. 63/221,755 filed on Jul. 14, 2021, the contents of which are incorporated by reference into this specification. This application also claims the benefit of U.S. Provisional Patent Application No. 63/221,755, filed on Jul. 14, 2021, the contents of which are also incorporated by reference into this specification.

FIELD

The present disclosure relates to alternative meat made from spent brewer's yeast (SBY) as the primary ingredient with the inclusion of more than 20%.

BACKGROUND

Spent brewer's yeast is a by-product of the brewing industry. The spent yeast cells are removed at the end of the bulk fermentation. A small amount of it is used to start the next batch of fermentation, the remaining part of the spent yeast is discarded. This discarded yeast is high in nutrients, in particular proteins, vitamins, and minerals, as well as containing functional and biologically active compounds such as polyphenols, antioxidants, β-glucans and mannoproteins.

Production of meat substitutes from spent brewers yeast and soy protein as promising applications was described by D. L. Gibson and B. K. Dwivedi in Can Inst. Food Technol. J Vol 3, No. 3, 1970. Side effects concerns of high levels of yeast feeding on uric acid metabolism of young men, expressed by J. C. Edozien et al in Nature vol 228, 1970 set safe limits of Ribonucleic acid (RNA) for human diet at 2 g per day. Spent brewer's yeast contains about 10-15% of RNA, limiting the use of SBY in food applications by 20% inclusion.

Currently, the majority of the spent brewers' yeast is composted or used as animal feed. Animal agriculture contributes to climate change with greenhouse gas emissions, new methods of processing spent brewers' yeast for direct human consumption are required.

SUMMARY

Alternative meat from a material comprising spent brewers' yeast as the primary ingredient is provided herein. The product contains from 20% to 80% dry weight spent brewers' yeast, has a meaty flavor and texture, and a reduced RNA content, making it safe for human consumption.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this disclosure.

BRIEF DESCRIPTION OF THE DRAWINGS

The features and advantages of the examples, and the manner of attaining them, will become more apparent, and the examples will be better understood, by reference to the following description of embodiments taken in conjunction with the accompanying drawings, wherein.

Figure 1:
FIG. 1 is a chicken skewer made according to Example #1.

The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Various examples are described and illustrated herein to provide an overall understanding of the structure, function, and use of the disclosed methods, systems, compositions, and products. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various examples disclosed and described in this specification can comprise, consist of, or consist essentially of the features and characteristics as variously described herein.

Any patent, publication, or other disclosure material identified herein is incorporated herein by reference in its entirety unless otherwise indicated but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout the specification to "various examples," "some examples," "one example," or "an example", or the like, means that a particular feature, structure, or characteristic described in connection with the example is included in at least one example. Thus, appearances of the phrases "in various examples," "in some examples," "in one example", or "in an example", or the like, in places throughout the specification are not necessarily all referring to the same example. Furthermore, the particular features, structures, or characteristics may be combined in any suitable manner in one or more examples. Thus, the particular features, structures, or characteristics illustrated or described in connection with one example may be combined, in whole or in part, with the features structures, or characteristics of one or more other examples without limitation. Such modifications and variations are intended to be included within the scope of the present examples.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

All ranges recited herein are inclusive of the endpoints of the recited ranges. For example, a range of "1 to 10" includes the endpoints 1 and 10. Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

In this specification, unless otherwise indicated, all percentages (e.g., weight percent protein, percent protein, percent moisture) are to be understood as being based on weight.

Alternative meat from a material comprising spent brewers' yeast as the primary ingredient is provided herein. The product contains 30% dry weight spent brewers' yeast, 10% dry weight Soy protein isolate, has a meat-like appearance and palatability, 24.4% by weight total protein content similar to animal meat and 0.099% RNA by weight, which is unexpected.

Such a low RNA content allows safely eating up to 10 times the FDA recommended daily amount of protein, which is equivalent to about 2 kg of animal meat, which is 8 times higher than average daily meat consumption from red meat, poultry, and fish (boneless weight) in the US according to USDA.

TABLE 1

Methods for RNA reduction for increased SBY-based protein consumption

| | Spent brewers' yeast untreated | Enzymatic hydrolysis Marson, 2020 | Phosphate solution, heat shock, dialysis or washing Canepa, 1972 | Alkaline Hydrolysis and heat treatment, Trevelyan, 1976 | Current invention, mix of 30% SBY and 10% Soy protein isolate | Upper safe level of RNA per day, g |
|---|---|---|---|---|---|---|
| RNA level, % | 10.00-15.00 | | | | | |
| RNA level for 50 g protein (according to FDA RDA based on 2000 cal diet), g | | 3.33-5.00 | 1.67-2.00 | 0.57-2.39 | 0.20 | <2 |
| RNA level for 60 g protein (average amount of protein consumed from red meat, poultry, and fish (boneless weight) in the US), g | | 4.00-6.00 | 2.00-2.40 | 0.68-2.87 | 0.24 | <2 |
| Safe amount of protein for daily consumption based on RNA content, g | | 20.00-30.03 | 50.00-59.88 | 41.84-175.44 | 492.93 | |
| Maximum amount of meat to eat safely per day (based on animal equivalent containing 26 g protein per 100 g), kg | | 0.08-0.12 | 0.19-0.23 | 0.16-0.67 | 1.90 | |

Spent brewers' yeast is a broad term, which describes spent yeast derived from multiple sources. In some embodiments, the source of spent yeast is chosen from spent brewers' yeast, spent distillers' yeast, surplus yeast from ethanol manufacturing, bakers' yeast, nutritional yeast. In some embodiments, the spent yeast is derived from various strains of Saccharomycetes class, such as *Saccharomyces cerevisiae, Saccharomyces pastorianus, Saccharomyces carlsbergensis*, etc.

Although currently spent brewer's yeast is mostly used for human consumption in the dried form, the use of liquid spent brewer's yeast (containing about 8-11% solids) and liquid concentrated spent brewer's yeast (containing about 15-25% solids) may benefit the manufacturing of high moisture meat analogs, simultaneously reducing costs for drying. In some embodiments, the spent yeast can be used in the dry, concentrated, liquid form, or a combination thereof. In some embodiments, the spent yeast may contain from about 10% to about 100% solids. In some embodiments, the primary ingredient can be debittered, autolyzed, or hydrolyzed.

Co-extrusion of spent brewers' yeast with secondary protein ingredients clears the aftertaste, adds meaty flavor and BBQ-like color, and reduces costs for debittering and drying. Low RNA concentration allows to increase the inclusion of spent brewers' yeast and to tweak the appearance and the taste towards chicken, fish, beef, and pork-like applications, reducing costs for secondary ingredients such as maskers, bitter blockers, flavors, and colors resulting in costs cheaper than animal meat.

In various examples, the product can comprise 80% of the spent brewers' yeast and 20% secondary protein ingredients. In various examples, the product can comprise 70% of the spent brewers' yeast and 30% secondary protein ingredients. In various examples, the product can comprise 60% of the spent brewers' yeast and 40% secondary protein ingredients. In various examples, the product can comprise 50% of the spent brewers' yeast and 50% secondary protein ingredients. In various examples, the product can comprise 40% of the spent brewers' yeast and 60% secondary protein ingredients. In various examples, the product can comprise 30% of the spent brewers' yeast and 70% secondary protein ingredients. In various examples, the product can comprise 20% of the spent brewers' yeast and 80% secondary protein ingredients.

Co-extrusion of spent brewers' yeast with secondary protein ingredients in their native form helped to improve succulent mouthfeel because of native fiber, capable of retaining more moisture without adding gums and binders. In some embodiments, the secondary protein ingredient is chosen from vegetable protein in its native, concentrated or isolated form, microbial protein, fungal protein, animal protein, cultured protein, or a combination thereof.

Despite having meat-like characteristics, spent brewers' yeast-based food products may benefit from the inclusion of secondary ingredients enhancing the sensory properties of the finished product. In some embodiments, the spent brewers' yeast food product may contain fat, carbohydrate, flavor, color, or a combination thereof. In some embodiments, the ingredients may contain 1-15% Fat, 0.5-2% dry weight Calcium Chloride, 0.5-1.5% dry weight gums (such as Sodium Alginate), 0.2-0.6% dry weight Lecithin.

Given different serving sizes set for different food products in some embodiments, the RNA content in the food product is easier to calculate as less than 4% of the food product's protein dry weight. In some embodiments, the RNA content in the food product is better to calculate as less than 2 g per serving.

EXAMPLES

The present disclosure will be more fully understood by reference to the following examples, which provide illustrative non-limiting aspects of the invention. It is understood that the invention described in this specification is not necessarily limited to the examples described in this section.

Example 1—Chicken Skewers, 22.2% by Weight Dry Equivalent of Spent Brewers Yeast 65% by weight liquid spent brewers' yeast, containing 11% solids, containing 49.6% protein, and 15% by weight dried spent brewers yeast, containing 51.2% protein were mixed with 20% by weight Soybean meal containing 50.4% protein and subjected to high moisture extrusion cooking at a temperature 150 C, pressure 20 bar, RPM 400 for 2 minutes.

Chicken-like skewers were prepared according to instructions: 0.5 kg of SBY-based meat cut into 25 mm square pieces. Marinated 2-6 hrs in a refrigerator (marinade: 2 tablespoons Miso paste, ¼ cup Lime juice, 1 teaspoon vegan fish sauce, 1 teaspoon shoyu, 2 teaspoons honey, 1 Jalapeno thin-sliced, 1 tablespoon toasted sesame oil). Vegetables for skewers: Crimini or shiitake mushrooms, sweet onion, Sweet pepper. Grilled on each side for 30 seconds.

The resulting product had a clean chicken-like taste with miso lime flavor and a muscle-like fibrous texture as shown in FIG. 1. The resulting product had 22.2% by weight dry equivalent of spent brewers yeast, 59.5% moisture content, 21.3% protein, and 0.072% RNA. The protein content was measured according to AACC 46-30 and AOAC 992.15. RNA extraction was performed, RNA quantification was measured via spectrophotometer and the residual RNA percentage was calculated based on the RNA concentration.

Example 2—Hop-Char Burger, 27.5% by Weight Dry Equivalent of Spent Brewers Yeast 70% by weight liquid concentrated spent brewers' yeast, containing 25% solids, containing 49.6% protein, and 10% by weight dried spent brewers yeast, containing 51.2% protein were mixed with 20% by weight Soybean meal containing 50.4% protein and subjected to high moisture extrusion cooking at a temperature 150 C, pressure 20 bar, RPM 400 for 2 minutes.

Hop-char burger was prepared according to instructions: 1 lb SBY-based meat, 6 oz cooked shiitake mushrooms, 1 tablespoon smoked paprika, 1 tablespoon honey, 1 tablespoon dark soy sauce, Irish moss equivalent of 2 small eggs, Salt & Pepper about 0.05% total weight. Meat processed in a food processor till broken down but not fully blended; mushrooms, spices, honey, soy sauce, herbs added and blended till ground beef consistency and transferred to a bowl to mix with the egg substitute till moisture content looks to match fresh ground beef. Patties formed 35 mm thick and cooked on the charbroiler.

Figure 2:
FIG. 2 is a hop-char burger made according to Example #2.

The resulting product had a succulent mouthfeel, umami flavor, and texture of ground beef as shown in FIG. 2. The resulting product had 27.5% by weight dry equivalent of spent brewers yeast, 57.6% Moisture content, 23.9% protein, and 0.089% RNA. The protein content was measured according to AACC 46-30 and AOAC 992.15. RNA extraction was performed, RNA quantification was measured via spectrophotometer and the residual RNA percentage was calculated based on the RNA concentration.

Example 3—Beef Stew, 30% by Weight Dry Equivalent of Spent Brewers' Yeast

30% by weight dried spent brewers yeast, containing 51.2% protein were mixed with 10% by weight Soy protein isolate, containing 90% protein and subjected to high moisture extrusion cooking at a temperature 150 C, pressure 20 bar, RPM 400 for 2 minutes.

Beef stew was prepared according to instructions: 1 lb SBY-based meat cut into approximate 25 mm triangles, 8 oz yellow onion, large dice, 8 oz carrot, 1" dice or oblique cut, 6 oz russet potatoes, peeled, large dice, ½ cup tamari (or soy sauce), 3½ cups room temperature water, 3 tablespoons raw sugar, 2 tablespoons curry powder, 3-3.5 oz prepared curry roux, 3 tablespoons neutral oil (grapeseed, avocado, canola). Marinade: combine tamari, sugar, curry powder, and 1 cup of water and whisk everything together until the sugar is dissolved. Sear SBY-based meat in a medium saucepan with 2 tablespoons of the oil for approximately 2 minutes per side. Once it's browned, plunge meat into the marinade and let it stand 10 minutes at room temperature. Using the same pan, add the remaining oil and sauté the carrots and onion over medium heat for about 3 minutes; stirring frequently. Add the potatoes, give it all a stir, and then crumble in your curry roux and then stir until it appears to be evenly distributed—about 30 seconds. Add the remaining water (2½ cups), stir, and bring the whole mixture to a boil. Once boiling, reduce heat to low, cover and simmer for about 15 minutes stirring frequently because it will want to stick. The potatoes and carrots should be slightly tender when poked with a knife at this point indicating that it's done. Serve with steamed rice.

Figure 3:
FIG. 3 is a beef stew made according to Example #3.

The resulting product had a strong beefy umami flavor and a muscle-like fibrous texture as shown in FIG. 3. The resulting product had 30% by weight dry equivalent of spent brewers' yeast, 60% Moisture content, 24.4% protein, and 0.099% RNA. The protein content was measured according to AACC 46-30 and AOAC 992.15. RNA extraction was performed, RNA quantification was measured via spectrophotometer and the residual RNA percentage was calculated based on the RNA concentration.

Example 4—Pulled Pork, 40% by Weight Dry Equivalent of Spent Brewers Yeast

40% by weight dried spent brewers yeast, containing 51.2% protein were mixed with 10% by weight Soy protein isolate, containing 90% protein and subjected to high moisture extrusion cooking at a temperature 150 C, pressure 20 bar, RPM 400 for 2 minutes.

Pulled pork lemongrass veggie bowl was prepared according to instructions: Ingredients to make 1 large bowl: 4 oz. SBY-based meat, shredded, 1 cup Rice noodles, cooked, ⅓ cup Purple Cabbage, sliced, 1/Mango, sliced, 5 each Snap Peas, 4 leaves head Little Gems Lettuce, 5 thin slices Watermelon Radish, Sprinkle of Black Sesame & Lime wedges. Marinade & dressing to make 2 cups: ½ cup Lime Juice & Lime zest, 2 Tablespoons Soy Sauce, ⅓ cup Fish Sauce, ¼ cup Maple Syrup, ¼ Oil, 4-8 gloves Garlic, 2-3 stalks Lemon Grass, tender white parts only, chopped, 1 shallot, peeled & halved. To make marinade & dressing: Combine all ingredients in a blender or food processor. Season with Salt & pepper. Divide marinade in half. With ¼ cup of marinade marinate shredded Planetarian meat in a small bowl for 5 minutes. To assemble bowl: Heat a cast iron pan until very hot. Sear shredded SBY-Based meat until caramelized and crispy. Adding more marinade if needed. In a large serving bowl arrange all the remaining fresh bowl ingredients. Place your seared SBY-Based meat on top. Drizzle with a few tablespoons of the remaining marinade. Indulge and enjoy.

Figure 4:
FIG. 4 is a pulled pork lemongrass veggie bowl made according to Example #4.

The resulting product had a pronounced meaty flavor and muscle-like fibers as shown in FIG. 4. The resulting product had 40% by weight dry equivalent of spent brewers yeast, 50% moisture content, 29.5% protein, and 1.32% RNA. The protein content was measured according to AACC 46-30 and AOAC 992.15. RNA extraction was performed, RNA quantification was measured via spectrophotometer and the residual RNA percentage was calculated based on the RNA concentration.

One skilled in the art will recognize that the herein described methods, processes, systems, apparatus, components, devices, operations/actions, and objects, and the discussion accompanying them, are used as examples for the sake of conceptual clarity and that various configuration modifications are contemplated. Consequently, as used herein, the specific examples/embodiments set forth and the accompanying discussions are intended to be representative of their more general classes. In general, use of any specific exemplar is intended to be representative of its class, and the non-inclusion of specific components, devices, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed, and not as more narrowly defined by particular illustrative aspects provided herein.

TABLE 2

SBY-based alternative meat applications according to examples

| | | Example 1. Chicken skewer | Example 2. Hop-char burger | Example 3. Beef stew | Example 4. Pulled pork |
|---|---|---|---|---|---|
| 1st SBY source | Liquid or concentrated SBY | 65% | 70% | | |
| | Solids | 11% | 25% | | |
| | Protein | 49.6% | 49.6% | | |
| | SBY-based protein | 4% | 9% | | |
| 2nd SBY source | Dry SBY | 15% | 10% | 30% | 40% |
| | Solids | 100% | 100% | 100% | 100% |
| | Protein content | 51.2% | 51.2% | 51.2% | 51.2% |
| | SBY-based protein | 8% | 5% | 15% | 20% |
| Dry SBY equivalent | | 22.2% | 27.5% | 30.0% | 40.0% |
| 2nd protein source | Soy isolate | 20.0% | 20.0% | 10.0% | 10% |
| | Protein content | 50.4% | 50.4% | 90.0% | 90% |
| | Total protein | 21.3% | 23.9% | 24.4% | 29.5% |
| | Moisture | 59.5% | 57.6% | 60.0% | 50% |
| | RNA | 0.072% | 0.089% | 0.099% | 0.132% |

REFERENCES

1. Gibson, D.; Dwivedi, B. Production of Meat Substitutes from Spent Brewers' Yeast and Soy Protein. Can. Inst. Food Technol. J. 1970, 3, 113-115.
2. Dietary Guidelines for Americans, Ninth edition, 2020 https://www.dietaryguidelines.gov
3. USDA Food Availability (Per Capita) Data System, 2021 https://www.ers.usda.gov/data-products/food-availability-per-capita-data-system/
4. J. C. Edozien et al. Effects of high levels of yeast feeding on uric acid metabolism of young men. Nature vol 228, 1970
5. Marson, G. V.; Saturno, R. P.; Comunian, T. A.; Consoli, L.; Machado, M. T. D. C.; Hubinger, M. D. Maillard conjugates from spent brewer's yeast by-product as an innovative encapsulating material. Food Res. Int. 2020, 136, 109365.
6. Canepa, A.; Pieber, M.; Romero, C.; Tohá, J. C. A method for large reduction of the nucleic acid content of yeast. Biotechnol. Bioeng. 1972, 14, 173-177.

7. Trevelyan, W. E. Chemical methods for the reduction of the purine content of baker's yeast, a form of single-cell protein. J. Sci. Food Agric. 1976, 27, 225-230.

What is claimed is:

1. A meat substitute suitable for human consumption comprising:
   at least 20% of a yeast by weight based on the dry weight of the meat substitute; and
   a ribonucleic acid (RNA) content less than 4% of the meat substitute's protein dry weight, and
   wherein the meat substitute is made by extruding a mix comprising a range of 40% to 80% of a liquid yeast by weight, inclusively, based upon the total weight of the mix.

2. The meat substitute of claim 1 wherein the liquid yeast comprises spent brewers' yeast, spent distillers' yeast, surplus yeast from ethanol manufacturing, bakers' yeast, nutritional yeast, or a combination thereof.

3. The meat substitute of claim 1 further comprising a secondary protein ingredient, wherein the secondary protein ingredient comprises vegetable protein, microbial protein, fungal protein, animal protein, or cultured protein, and wherein the secondary protein ingredient is in a native, concentrated, or isolated form, or a combination thereof.

4. The meat substitute of claim 1 wherein the liquid yeast comprises 8 to 25% solids, inclusively, based on the total weight of the liquid yeast.

5. The meat substitute of claim 1 wherein the liquid yeast comprises 8 to 11% solids, inclusively, based on the total weight of the liquid yeast.

6. The meat substitute of claim 1 wherein the liquid yeast comprises 15 to 25% solids, inclusively, based on the total weight of the liquid yeast.

7. The meat substitute of claim 1 wherein mix comprises from 65 to 70% liquid yeast by weight, inclusively, based upon the total weight of the mix.

8. The meat substitute of claim 1 wherein the liquid yeast comprises one or more of debittered, autolyzed, or hydrolyzed yeast.

9. The meat substitute of claim 1 wherein the extrusion comprises a heat treatment and a pressure treatment.

10. A meat substitute suitable for human consumption comprising:
    at least 20% of a yeast by weight based on the dry weight of the meat substitute; and
    a ribonucleic acid (RNA) content less than 4% of the meat substitute's protein dry weight, and wherein the meat substitute is made from a mix comprising a range of 40% to 80% of liquid yeast comprising spent brewers' yeast.

11. The meat substitute of claim 10 further comprising a secondary protein ingredient wherein the secondary protein ingredient comprises vegetable protein, microbial protein, fungal protein, animal protein, or cultured protein, and wherein the secondary protein ingredient is in a native, concentrated, or isolated form, or a combination thereof.

12. The meat substitute of claim 10 wherein the RNA content is less than 0.14% of the meat substitute's dry weight.

13. The meat substitute of claim 10 wherein the RNA content is greater than 0.07% and less than 0.14%, inclusively, of the meat substitute's dry weight.

14. The meat substitute of claim 10 wherein the extrusion comprises a heat treatment and a pressure treatment.

15. A meat substitute suitable for human consumption comprising:
    10 to 20% yeast protein by weight, inclusively, based on the total dry weight of the meat substitute;
    at least 30% by weight of at least one secondary protein ingredient based on the total weight of the meat substitute; and
    a ribonucleic acid (RNA) content less than 4% of the meat substitute's protein dry weight.

16. The meat substitute of claim 15 wherein the source of the yeast protein comprises spent brewers' yeast, spent distillers' yeast, surplus yeast from ethanol manufacturing, bakers' yeast, nutritional yeast, or a combination thereof.

17. The meat substitute of claim 15 wherein the secondary protein ingredient comprises vegetable protein, microbial protein, fungal protein, animal protein, or cultured protein.

18. The meat substitute of claim 15 wherein the RNA content is less than 0.14% of the meat substitute's dry weight.

19. The meat substitute of claim 15 wherein the RNA content is greater than 0.07% and less than 0.14%, inclusively, of the meat substitute's dry weight.

20. The meat substitute of claim 16 wherein the meat substitute is made by co-extruding the source of the yeast protein and the second protein ingredient, wherein the co-extruding comprises a heat treatment and a pressure treatment.

* * * * *